United States Patent [19]
Kühn et al.

[11] Patent Number: 5,450,081
[45] Date of Patent: Sep. 12, 1995

[54] AUDIO SIGNAL REPRODUCTION APPARATUS WITH FREQUENCY RESPONSE DEPENDENT UPON ERROR RATES

[75] Inventors: Hans-Robert Kühn, St. Georgen; Dieter Storz, Lauterbach, both of Germany

[73] Assignee: Deutsche Thomson-Brandt GmbH, Villengen-Schwenningen, Germany

[21] Appl. No.: 133,597

[22] Filed: Oct. 7, 1993

[30] Foreign Application Priority Data

Oct. 9, 1992 [DE] Germany .................. 42 34 015.2

[51] Int. Cl.⁶ .......................................... H03M 13/00
[52] U.S. Cl. .................................. 341/94; 371/5.1; 395/2.74
[58] Field of Search ............. 395/2.33, 2.37, 2.74; 371/5.1, 5.5, 31; 341/94

[56] References Cited

U.S. PATENT DOCUMENTS

| | | | |
|---|---|---|---|
| 4,414,668 | 11/1983 | Iwasaki | 371/5.5 |
| 4,430,736 | 2/1984 | Scholz | 371/31 |
| 5,113,397 | 5/1992 | Kaaden et al. | 371/5.1 |
| 5,148,431 | 9/1992 | Hayashi | 371/5.1 |
| 5,305,332 | 4/1994 | Ozawa | 395/2.37 |

FOREIGN PATENT DOCUMENTS

| | | |
|---|---|---|
| 3330399 | 5/1984 | Germany . |
| 3414990 | 10/1985 | Germany . |
| 3639753 | 6/1988 | Germany . |
| 3709207 | 9/1988 | Germany . |

*Primary Examiner*—Howard L. Williams
*Attorney, Agent, or Firm*—Joseph S. Tripoli; Eric P. Herrmann; Ronald H. Kurdyla

[57] ABSTRACT

Apparatus for reproducing coded audio signals includes interpolation circuitry for substituting interpolated signal values for erred or lost audio signal. To minimize undesirable audible artifacts which may be introduced into the audio signal by virtue of the substitution process, the rate of substitution is monitored. When the rate of substitution exceeds a predetermined rate, the higher frequency components of the audio signal, including the substituted values, are attenuated.

8 Claims, 6 Drawing Sheets

AUDIO SIGNAL REPRODUCTION APPARATUS WITH FREQUENCY RESPONSE DEPENDENT UPON ERROR RATES

This invention relates to audio reproduction apparatus and more particularly to apparatus for concealing segments of lost audio signal.

BACKGROUND OF THE INVENTION

During the reproduction of audio signals, in particular digital audio signals, isolated or long-lasting errors occur that cannot be corrected by a corresponding data correcting system. To conceal extended error bursts, some systems generate an estimate of the probable signal by performing an interpolation from nearby signals, which estimate, to a certain extent, will not nominally be perceivable by the ear. Interpolations of this type are performed, for example, in the integrated circuits CXD1167Q available from Sony or the SAA7220 available from Philips. A disadvantage of these devices is that under certain conditions the interpolations are perceivable by the user. It has been discovered that the audibility of such interpolations is heavily dependent on the frequency of interpolations and the audio frequency of surrounding data. In particular, at lower audio frequencies, a higher interpolation rate can be permitted without significant perception than for higher audio frequencies.

SUMMARY OF THE INVENTION

In accordance with the invention, an apparatus or method for the reproduction of an audio signal includes circuitry for generating interpolated signal for substitution of incorrectable data. The decoded data, including substitute interpolated signal is applied to a selectively controlled attenuator. The rate of occurrence of interpolated signal is monitored, and if such rate exceeds a predetermined threshold over predetermined intervals, a control pulse is generated. The control pulse is applied to the selectively controlled attenuator to reduce the amplitude of ones of the frequency components of the decoded audio signal.

DETAILED DESCRIPTION

Figure 1:
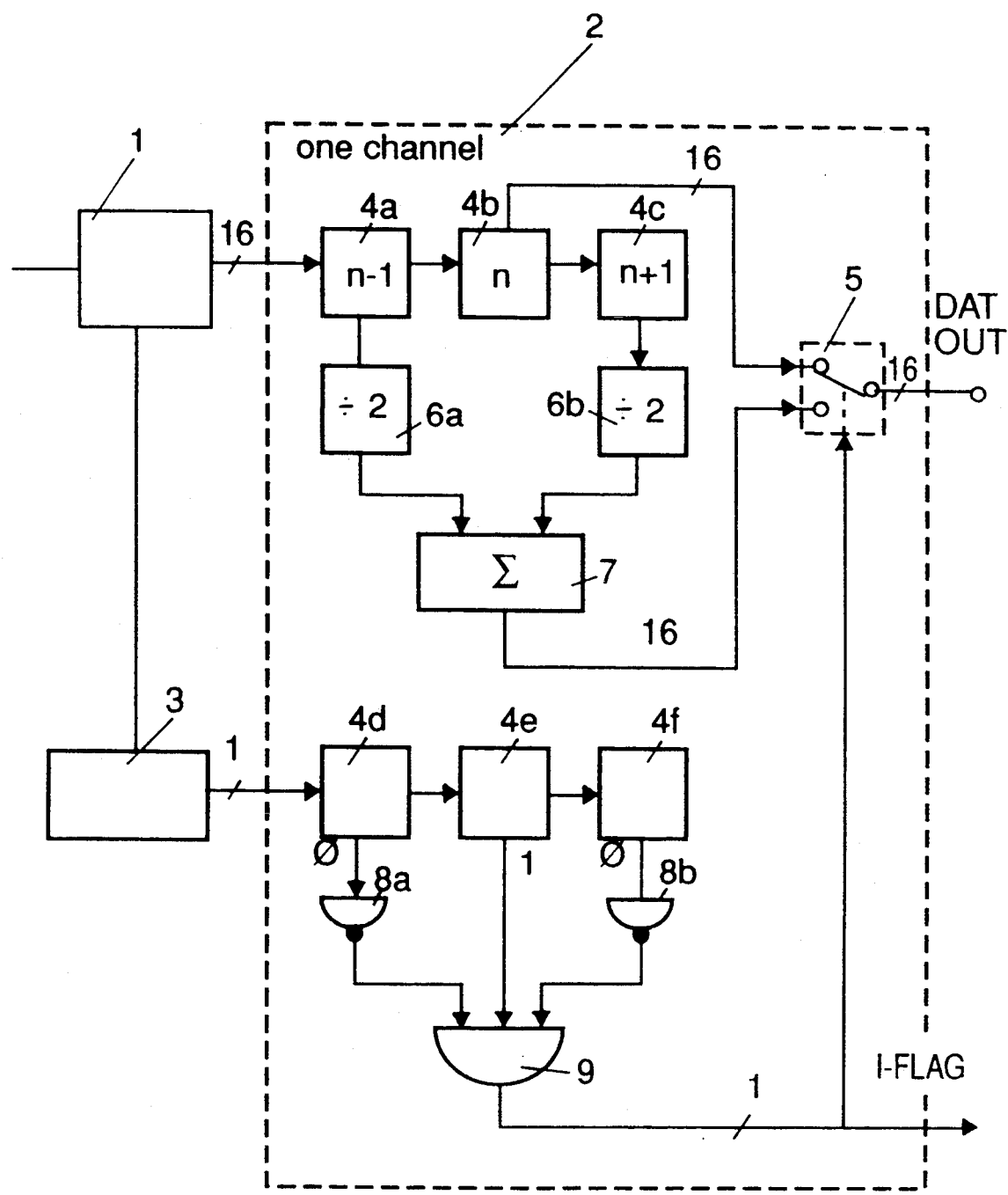
FIG. 1 is a block diagram of a portion of an audio decoder including an error detection/correction stage and an interpolator stage.

FIG. 1 shows a basic circuit of an audio reproduction circuit having a linear interpolation stage 2 and an error correcting circuit 1 such as is known for example from Sony IC CXD1167Q or Philips SAA7220. The error correcting stage 1 has two outputs, the first of which is directly connected to the interpolation stage 2 of an audio channel and the second of which is connected to an input of a sample value checking circuit (sample check) 3. The first output of the error correcting circuit 1 is connected to an input of a first sample and hold circuit $(n-1)$ $4a$ which, for its part, is connected to a further sample and hold circuit $4b$ via a data bus. Moreover, the first sample and hold circuit $4a$ is connected to a divider which divides the value of the sampling value by 2. One output of the sample and hold circuit $4b$ is coupled directly to a first input terminal of a switch 5 while another output of the sample and hold circuit $4b$ is connected to an input of a third sample and hold circuit $4c$ $(n-1)$ whose output is connected to a second divider circuit $6b$. The outputs of the two divider circuits $6a$ and $6b$ are connected respectively to a summing circuit 7 whose output is coupled to a second input terminal of the switch 5. The output of the switch 5 forms the data output of the interpolation stage.

The sample value checking circuit 3 checks the sampling values for deficiencies i.e. including their lack of correctability by the error correcting stage 1, and generates a logical 1 for a faulty sampling value and a logical 0 for a correct sampling value. These values are supplied to a cascade connection of register circuits $4d$, $4e$ and $4f$. The outputs of the register circuits $4d$ and $4f$ are connected respectively to inverters $8a$ and $8b$ whose outputs are coupled to respective input terminals of an AND circuit 9. The output of the register circuit $4e$ is coupled to a third input terminal of the AND circuit 9. The output of the AND circuit is coupled to control the switching circuit 5 between positions of the outputs of the summing circuit 7 and the sample and hold circuit $4b$. That is, when correct samples are available at the sample and hold circuit $4b$, the switch 5 passes samples from the sample and hold circuit $4b$. When uncorrectable erred samples are resident in the sample and hold circuit $4b$, then the switch 5 is conditioned to pass interpolated samples from the summing circuit 7. Furthermore, the output of the AND circuit 9 is made available from the interpolation stage as a herein designated J-Flag output.

Figure 2:
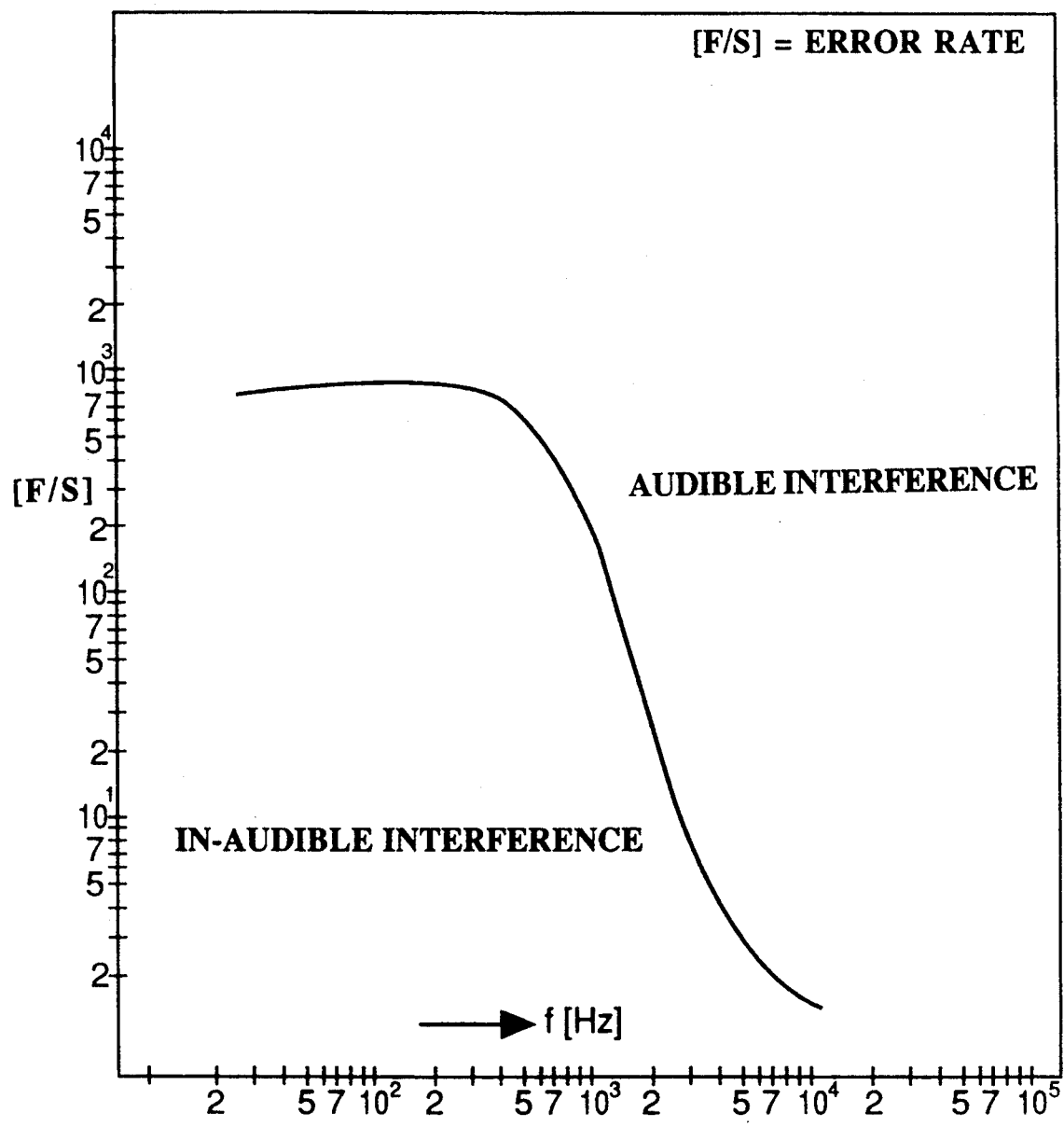
FIG. 2 an illustration of the frequency dependent threshold of audibility of interpolations during the reproduction of sinusoidal signals.

FIG. 2 shows the waveform of the experimentally determined threshold of audibility against the number of interpolations per second or the error rate in dependence on the audio frequency (drawn logarithmically). A higher interpolation rate can be allowed for lower frequencies than for higher frequencies.

Figure 3:
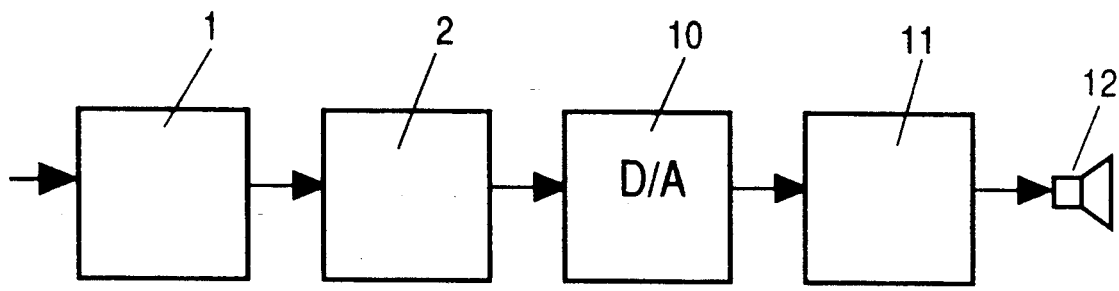
FIG. 3 a block diagram of a known audio reproduction circuit including an error corrector and an interpolator.

FIG. 3 shows a block diagram of an audio reproduction circuit of a conventional type which has an error correcting circuit 1, an interpolation stage 2, a D/A converter 10, a circuit 11 for the processing of analog audio signals and a loudspeaker 12.

Figure 4:
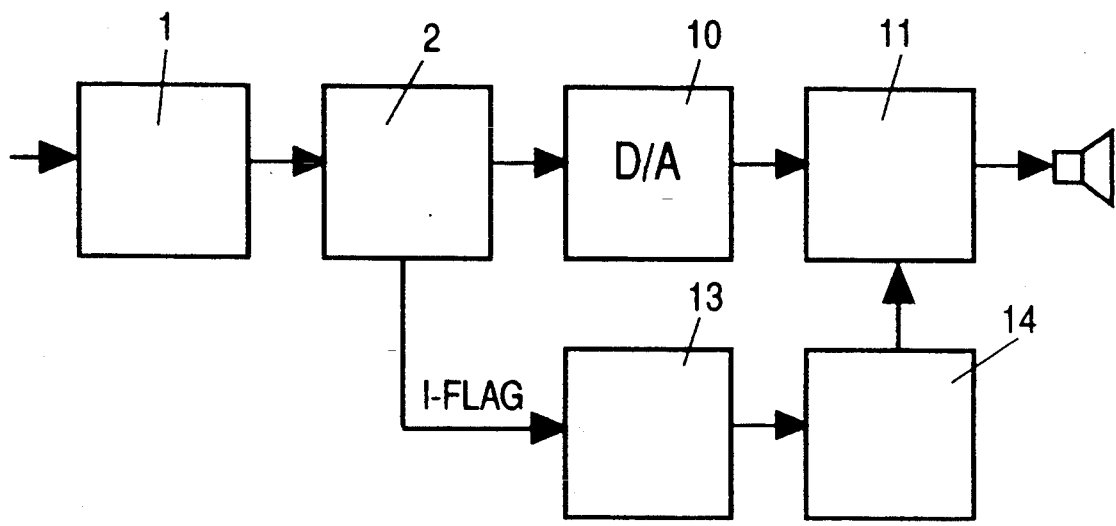
FIGS. 4, 5, 7, 8 and 9 are block diagrams of alternative audio reproduction circuits including an interpolator and a selective attenuator embodying the present invention.

FIG. 4 shows a block circuit diagram of an audio reproduction circuit in accordance with the invention. The interpolation circuit 2, which may be similar to the one in FIG. 1, is connected to an output of a known error correcting circuit 1. The data output of the interpolation circuit 2 is connected to the input of a digital to analog converter 10 whose output is connected to an analog audio signal processing circuit 11. The J-Flag output of the interpolation stage 2 is connected to a threshold value evaluating and processing stage 13 which is connected to a physiological correcting and control stage 14. The physiological correcting stage 14 conditions the processing circuit 11 to reduce the amplitude of the higher frequencies of the analog audio signal in accordance with whether the interpolation rate exceeds a predetermined threshold value, S.

Figure 5:
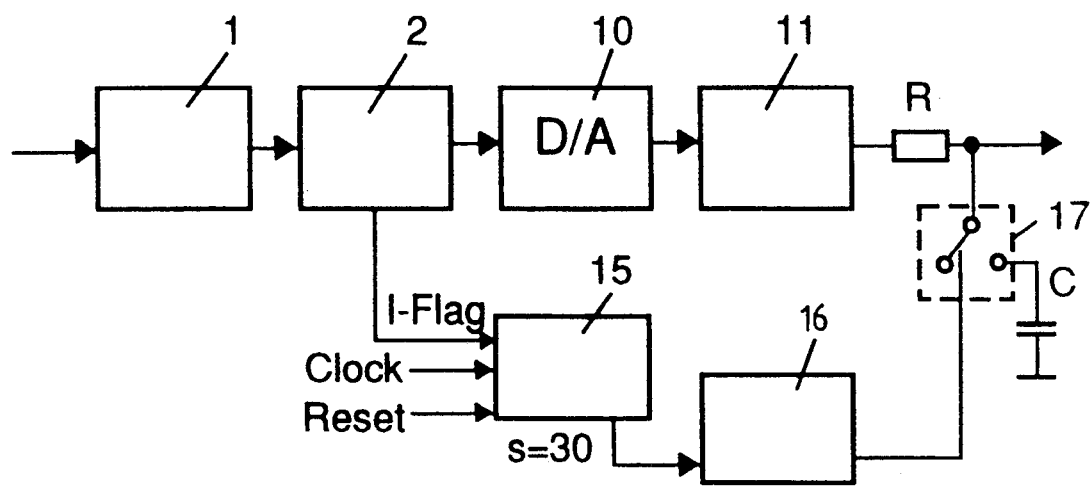
Figure 6:
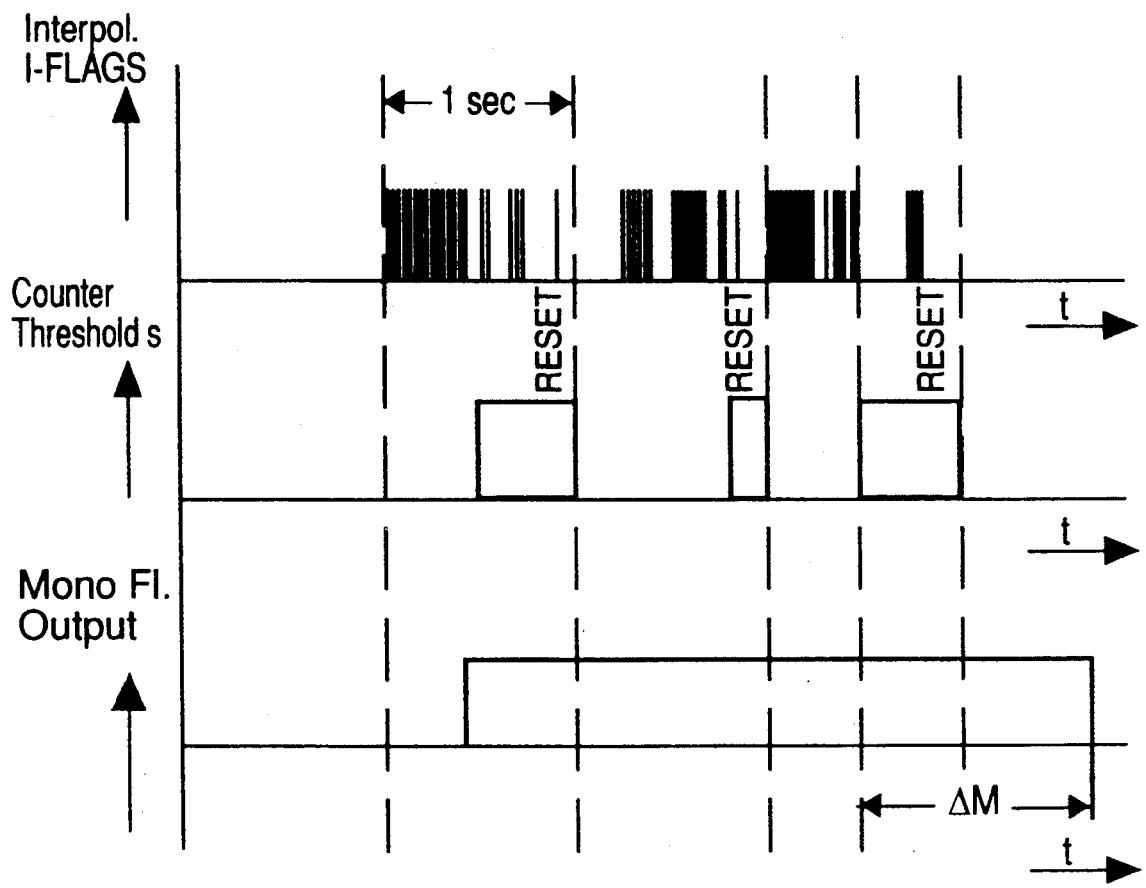
FIG. 6 a pulse diagram useful in describing the operation of the circuit of FIG. 5

In practical experiments, it has been shown that the threshold value S should preferably be about 30 interpolations per second. The number of interpolations occurring in each second may be determined by means of a counter 15 which has a clock and reset inputs in addition to the J-Flag output as is depicted in FIG. 5. Upon exceeding the threshold value S, a low pass filter 17 in the audio section is activated in a simple manner via a mono flip flop 16 which provides a control pulse of predetermined width "M". The pulse timing of the apparatus in accordance with FIG. 5 is shown in FIG. 6. Analysis of the number of interpolations per unit time is, in the FIG. 6 illustration performed over one second intervals. At the end of each interval, the output of the counter 15 is reset to zero by means of the reset signal. If the count value in the counter at the end of respective intervals is greater than the threshold, resetting the counter will cause a voltage transition at the counter output. The occurrence of such a transition will trigger the mono flip flop 16 to generate a pulse which activates the low pass filter 14 until such time as the number of interpolations per unit of time falls below the predetermined value.

Figure 7:
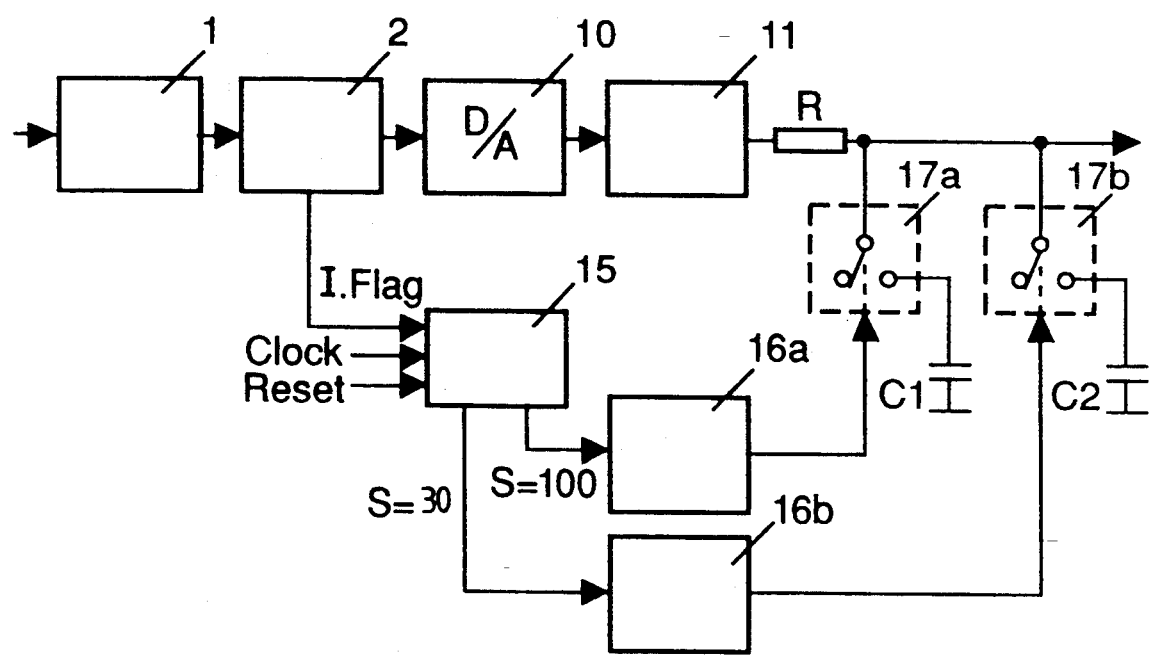

FIG. 7 illustrates a block diagram of an audio reproduction circuit having a two stage physiological control means. A multi-step reduction of the higher frequencies is effected by such a circuit. In dependence on the magnitude of the interpolation rate, a plurality of low pass filters 17a, 17b in the analog audio reproduction circuit are activated by corresponding mono flip flops 16a, 16b. Assuming the counter provides binary output bits, different ones of these bits may be decoded to provide first and second trigger signals which are coupled to the respective mono flip flops. For example the count values 30 and 100 may be decoded to provide logic high values when these counts are exceeded. If the reset function causes a high to low transition on the respective decoded output the respective mono flip flop will be triggered. Thus if a count of 135 occurs in an analysis interval, both mono flip flops will be triggered, causing both low pass filters 17a and 17b to be switched into the signal path. Alternatively if the count value is 54, then only mono flip flop 16b will be triggered causing only low pass filter 17b to be switched into the signal path.

Figure 8:
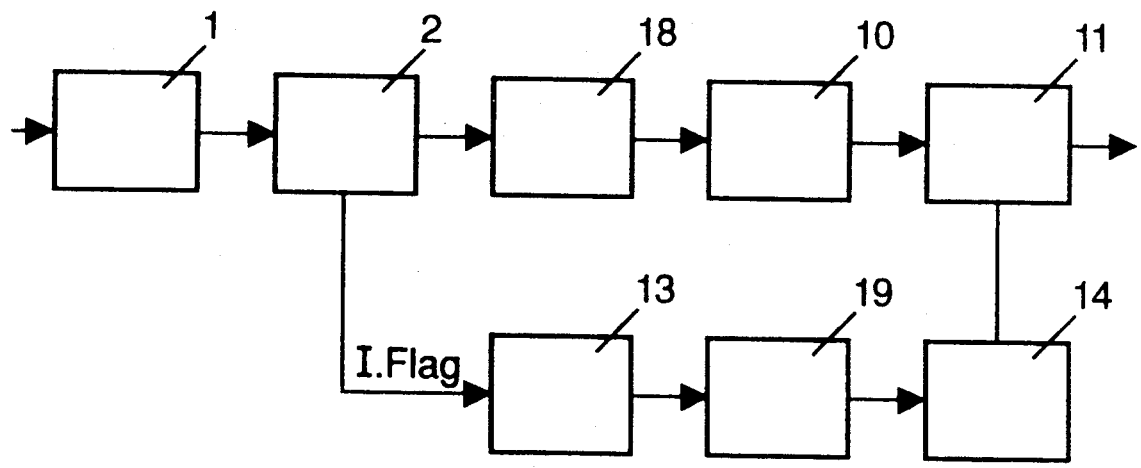

FIG. 8 shows a further development of the invention in accordance with FIG. 4. In FIG. 8, a buffer 18 is provided for the storage of the audio data in the digital signal path. This buffer, which may be constructed as a so-called shock memory, can be used to effect an improvement of the physiological control when interpolations occur, in such a way, that the control is turned on even before the start of interpolation interference. That is the audio signal is delayed for a period equal to an analysis interval such that the results of analysis may be applied to the signal interval analyzed. To this end the J flag output of the interpolation stage 2 is connected to the J Flag input of the threshold value stage 13. A timing member 19, which is connected to the physiological control stage 14 that is effective for its part on the analog output stage 11, is connected to an output of the threshold value stage 13. A digital to analog converter 10 is arranged between the buffer 18 and the analog output stage 11.

Up to this point, the examples have been shown only the analog side of physiological audio control of audio reproduction circuitry.

Figure 9:
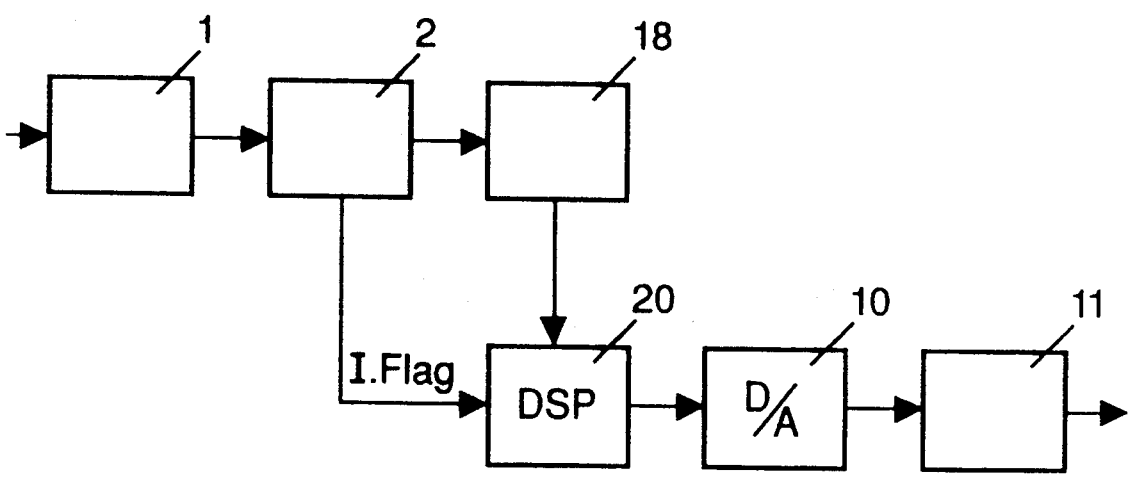

FIG. 9 shows an example for the physiological control of the audio signals at the digital side. To this end, upon the occurrence of interpolation flags, the data that was stored in the buffer 18 is assessed by means of digital filters in a digital signal processor 20 (DSP) as regards frequency and a corresponding reduction of the amplitude of the high frequencies is effected. The output of the digital signal processor 20 is connected to the D/A converter stage 10 to which the analog audio output stage 11 is then subsequently connected.

The invention may be used in digital audio and video systems of every kind, in particular in apparatus and circuits in the fields of compact discs (CD), magneto-optic discs (MOD), digital audio broadcast (DAB), digital satellite radio (DS), NICAM apparatus, digital compact cassettes (DCC), mini discs (MD) as well as in audio systems in which errors that can no longer be corrected in corresponding error correcting systems are interrupted by an interpolation.

What is claimed is:

1. A method, for the reproduction of an audio signal which is subjected to signal errors, comprising: generating interpolated signal values from signal proximate said signal errors; substituting said interpolated signal values for said signal errors; and reducing the amplitude of higher frequency components of said audio signal including said interpolated values when the rate at which said interpolated values are generated exceeds a predetermined rate.

2. The method set forth in claim 1 further comprising: counting the number of substituted said interpolated values in respective intervals and reducing the amplitude of said higher frequency components more than the amplitude of lower frequency components of said audio signal including said interpolated values only when the number counted in respective said intervals exceeds a predetermined threshold.

3. The method set forth in claim 2, wherein the step of reducing the amplitudes of said higher frequency components comprises selectively low pass filtering said audio signal including substituted interpolated values.

4. In circuitry for the reproduction of audio signals, which includes an interpolation stage to substitute interpolated values for erred signal values, apparatus comprising:
    means for measuring the number of substituted interpolated values per predetermined unit of time; and
    means for reducing the amplitude of frequency components of the audio signals in dependence on the measured rate of substituted interpolated values to reduce the audibility of signal artifacts introduced by substituting interpolated values for erred signal values.

5. The apparatus set forth in claim 4, wherein said means for measuring includes a counter for counting the number of substituted interpolated values in predetermined intervals and wherein said amplitude of frequency components is reduce only when the counted number per interval exceeds a predetermined threshold.

6. The apparatus set forth in claim 5, wherein said audio signal is a digital audio signal, and said apparatus further includes:
    a digital to analog converter stage coupled to receive said audio signal from said interpolation stage for converting said digital audio signal to analog form; and
    wherein said means for reducing the amplitude of said frequency components includes a selectively engaged low pass filter to lessen the bandwidth of the audio signals, responsive to said means for measuring.

7. The apparatus set forth in claim 4, wherein said means for reducing includes a low pass filter which is selectively included in a signal processing path to reduce the amplitudes of the higher frequency components of the audio signal, responsive to said means for measuring.

8. The apparatus set forth in claim 4, wherein said means for reducing includes a plurality of low pass filters each of which is selectively included in a signal processing path, in dependence upon a different measured rate of substituted interpolated values, to reduce the amplitudes of the higher frequency components of the audio signal.

* * * * *